United States Patent [19]

Perego

[11] 4,077,641
[45] Mar. 7, 1978

[54] BABY CARRIAGE FOLDABLE IN WIDTH AND SHORTENABLE IN HEIGHT

[75] Inventor: Giuseppe Perego, Arcore (Milan), Italy

[73] Assignee: Perego-Pines S.p.A., Italy

[21] Appl. No.: 713,493

[22] Filed: Aug. 11, 1976

[30] Foreign Application Priority Data

Apr. 26, 1976 Italy .................................. 22657/76

[51] Int. Cl.² ............................................. B62B 7/08
[52] U.S. Cl. ...................................... 280/42; 280/650
[58] Field of Search ............... 280/641, 642, 644, 647, 280/650, 42; 296/1 B, 28 B

[56] References Cited

U.S. PATENT DOCUMENTS

| 2,616,718 | 11/1952 | Heideman | 280/650 |
| 2,847,058 | 8/1958 | Lee | 280/42 X |
| 3,689,099 | 9/1972 | Patterson | 280/642 X |
| 3,836,164 | 9/1974 | Sugino et al. | 280/42 X |
| 3,917,302 | 11/1975 | Gebhard | 280/644 |
| 3,936,069 | 2/1976 | Giordani | 280/644 |
| 3,953,046 | 4/1976 | Johansson | 280/644 |
| 3,995,882 | 12/1976 | Watkins | 280/42 X |

Primary Examiner—Joseph F. Peters, Jr.
Assistant Examiner—Michael J. Forman
Attorney, Agent, or Firm—McGlew and Tuttle

[57] ABSTRACT

A baby carriage which can be readily collapsed between an operative extended position and a folded inoperative position having connected front and rear leg members and including upper tong members and lower tong members whereby the lower tong members have one end thereof hingedly connected to the rear legs and having the other end thereof hingedly connected to tie rods which are hingedly connected to the rear legs, so that the carriage is rendered readily collapsible by the operation of a hand actuator.

7 Claims, 7 Drawing Figures

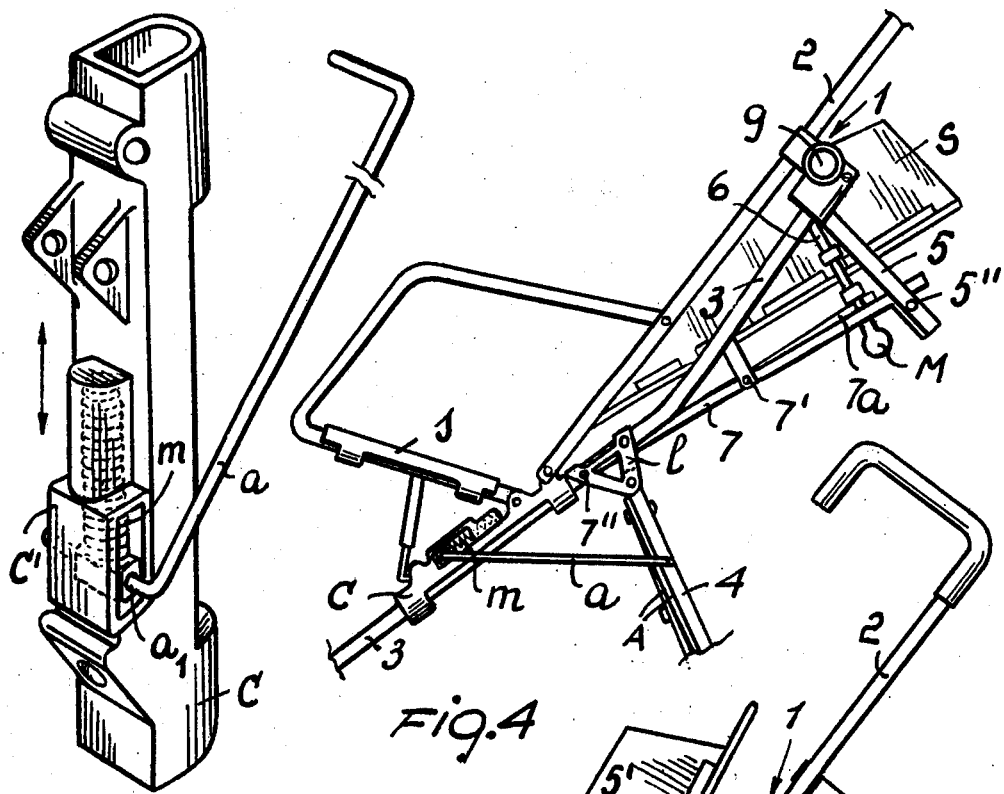
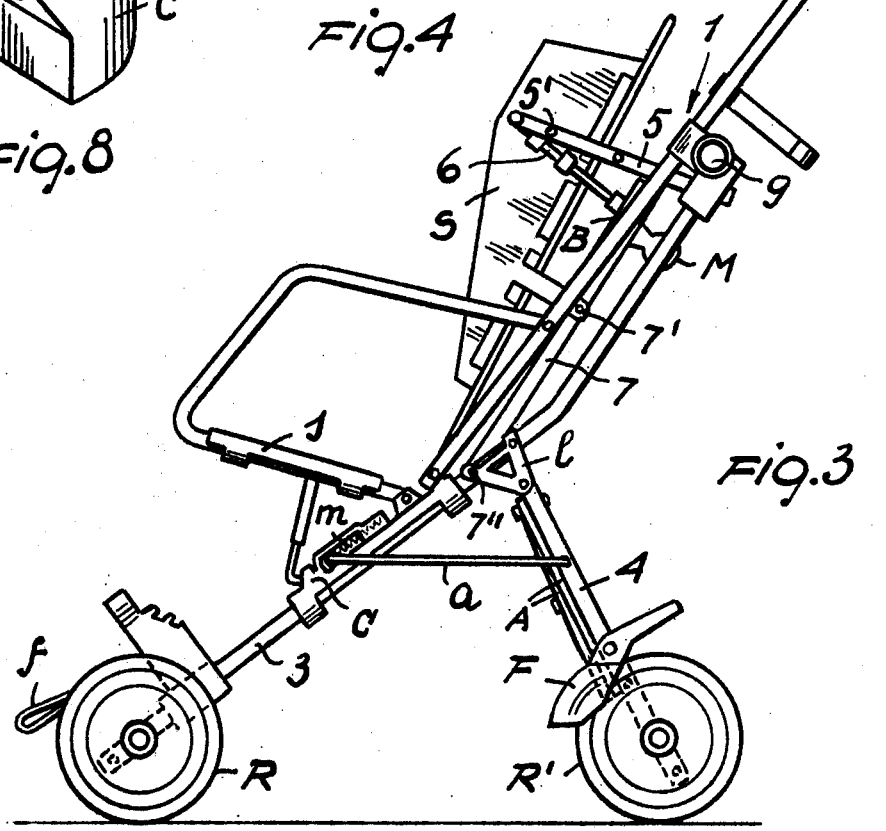

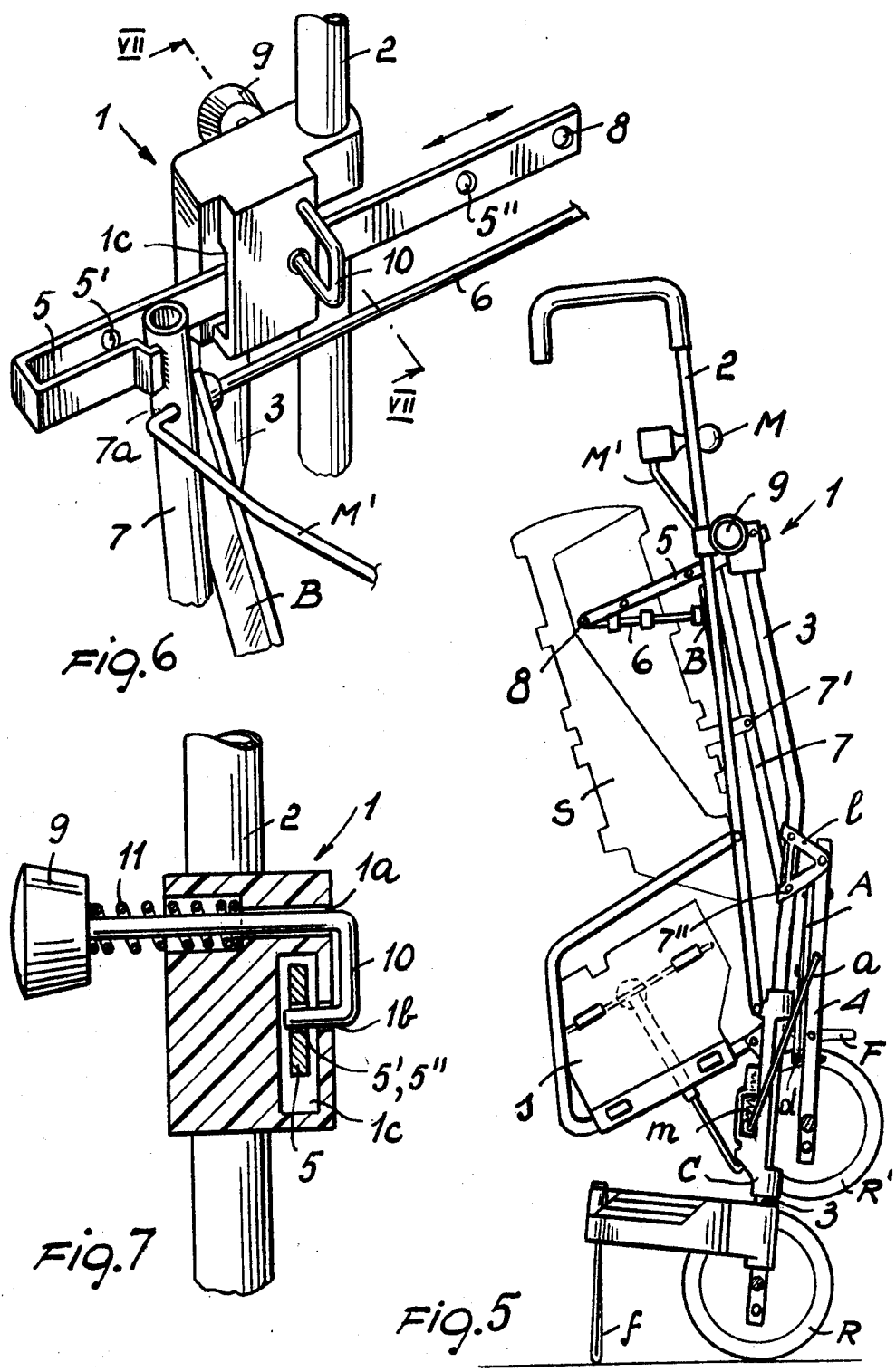

BABY CARRIAGE FOLDABLE IN WIDTH AND SHORTENABLE IN HEIGHT

In USA Pat. application No. 647876 filed on Jan. 9, 1976 by the same applicant there is disclosed a foldable baby carriage comprising a crosspiece or spider having ends which are integral with an equal number of sleeves, the upper ones sliding on the handles and the lower ones on the front legs of the carriage, and a knob located at the center with respect to the upper sleeves and connected thereto by means of two tie rods. The arms of said crosspiece are moved apart like a tong or "X" or moved closer to or away from each other by pushing a knob downwardly or upwardly whereby the upper sleeves slide upwardly and the lower ones downwardly and viceversa thus shortening or extend in the height and width of the baby carriage.

There is further disclosed in USA Pat. application No. 647876 a. L-shape tie rods actuated by the knob, and having an arm which terminates integral with one side of the seat-back whereby the seat-back is folded in the direction of its width;
b. the provision of a rigid structure for defining the seat-back as well as for the seat;
c. the provision of telescoping small tubes having the inner sliding portions fixed to the lower sleeves and the outer cylindrical portions welded to iron rods provided under the seat, whereby the seat may be folded or collapsed in "book" fashion;
d. the provision of straps connecting the rear legs with the lower sleeves and the lower ends of the handles so that the rear legs fold closer to the front ones during folding.

USA Pat. application No. 647815 filed on Jan. 9, 1976, now U.S. Pat. No. 4,007,947, issued Feb. 15, 1977 is directed to an improved solution of the know baby carriages, of the type having a baby carriage back inclinable in various positions with respect to the vertical. This was obtained by disengaging the crosspiece and the knob tie rods from the upper sleeves and indirectly connecting them to the upper sleeve by means of two vertical frame members, and two units consisting of a metal strap and spring hook to adjust and retain the seat-back.

In both of said solutions, plastic bands are provided between the front wheels as well as between the rear wheels. The plastic bands includes two rigid portions hinged at one end with one of the legs and at the other with a centre pin so as to keep said legs apart from or close to each other depending on whether they assume an extended or a folded position. In order to fold the baby carriage it is necessary to actuate not only on the knob placed at the center with respect to the upper sleeves, but also the band provided between the rear legs.

An object of this patent application is to provide:

instead of the aforementioned band, a second crosspiece having two ends, the upper ones hinged to the rear legs of the baby carriage and the other two, the lower ones, hinged to two tie-rods which are also hinged to the rear legs;
another object is to provide suitable springs housed in the projecting portion of the sleeves fixed to the edges of the seat at one end and sliding on the front legs whereby the springs are compression stressed by the hooked terminal portion of a rod which crosses and rests against one of its ends, said rod being secured as the other end to the corresponding rear leg;
another object is to provide small double squares or triangular plates, hollow at the centre, secured by the portion joining the two halves to each front leg and pivoted with the opposite apex to the corresponding rear leg. The aforesaid first mentioned object permits automatic folding of the baby carriage whereby it is readied ready for use by acting only on the knob placed at the centre with respect to the upper sleeves, as has been described in the main patent application.

The second and third mentioned objects enable the springs to act in compression and permit the rear legs to come closer to the front legs during folding, respectively, to provide maximum ease and automation in folding of the baby carriage and its subsequent extension.

The accompanying drawings given by way of example only and without limitation show a preferred embodiment of the foldable baby carriage of the present patent application.

In the drawings:

FIG. 3 is a side view of the baby carriage ready for use with the seat-back almost vertical; and FIG. 4 is similar to FIG. 3 but with the seat-back folded backwards, and handles and wheels omitted for sake of clarity;

FIG. 5 shows in a side view the baby carriage folded.

FIGS. 6 and 7 show, on an enlarged perspective view and side view, respectively, the latter being partially sectioned along lines VII—VII of FIG. 6 of, one of the units consisting of a small plate and a spring hook provided to adjust and retain the seat-back;

FIG. 8 shows in a perspective view the detail of a sleeve with the spring covered in the protruding portion.

Figure 1:
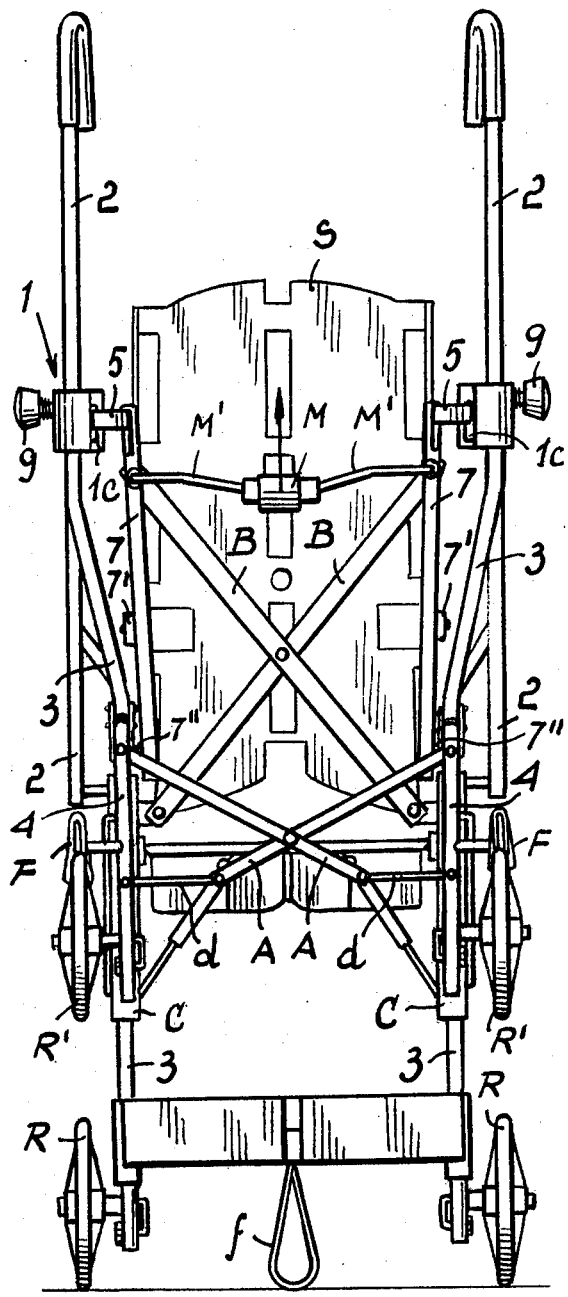
FIG. 1 is a rear view of the baby carriage in its position ready for use.

As may be seen in the drawings there is shown a baby carriage having handles 2, front legs 3 and rear legs 4, to which are connected wheels R and R' having a brake F; a seat s and a seat-back S.

The upper crosspiece or tongs has arms B capable of coming closer to each other or moving apart from one another by actuation of an actuator or knob M by means of tie rods M'. The upper sleeves sliding on handles 2 are indicated with reference number 1. A slot 1C is formed in sleeve 1. The arms of tie rods M' are integral with the seat-back S with 6. Handgrips 9 biased by means of springs 11 adjusts the straps 5 and the seat-back S in the desired position. This is attained by introducing a lock pin or hook 10 connected to handgrips 9 in holes 1a and 1b of sleeve 1 so as to align with the selected hole 5' or 5" of strap 5.

Frame members 7 are secured to the seat-back S at 7', to the front legs 3 at 7" and are crossed by tie rods M' at 7a. The end of strap 5 is fixed at 8 to the respective arm 6 of tie rod M'. The lower slider C slide on the front legs 3 and has inside the projecting portion or housing C'. Springs m disposed in projection portion C compressed by rods a. By means of which are "loop" f provided at the front, the baby carriage rests erected on the floor after it has been folded.

Figure 2:
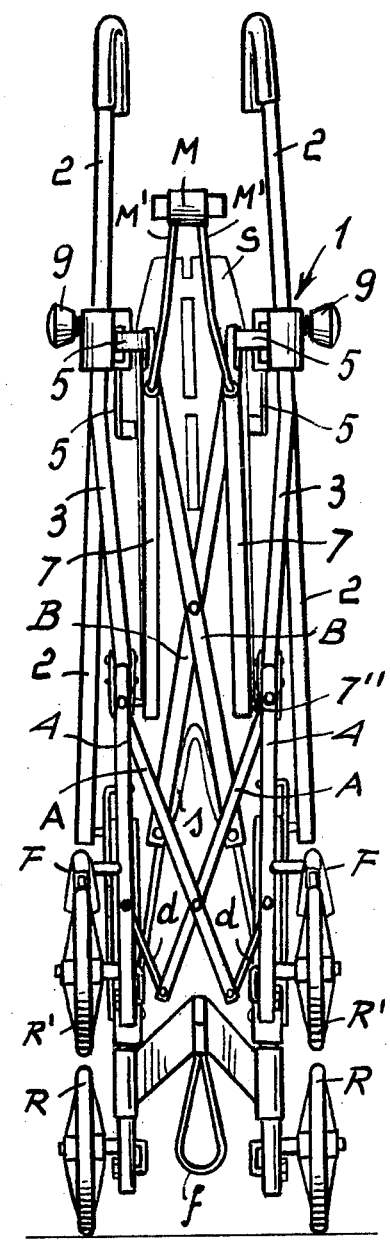
FIG. 2 is a rear view of the baby carriage in the folded position.

The original part of the baby carriage in question consists of the lower crosspieces A—A hinged to the rear legs 4 and to tie rods d, the latter being also hinged to rear legs 4. This solution enables folding in width of the baby carriage without resorting to the sliding sleeves. The small plates or bracket L connect the front legs and the rear legs. Therefore, in operation to change the position of the baby carriage from folded position to ready for use position and vice-versa is very simple because it is only necessary to lower or raise knob M in order to bring the baby carriage from FIG. 1 position to FIG. 2 and FIG. 5 position, or vice-versa. In fact, by raising knob M crosspieces B and A place the respective cross bars in an almost side-by-side position, the sleeves 1 are raised and sleeves C are lowered, the seat-back S and the seat s are folded, the rear legs 4 are raised and moved closer to the front legs 3.

What we claim is:

1. A baby carriage adapted to fold between a folded position and an extended position having a pair of front leg members, wheels mounted on said front leg members, a slider slideably mounted along a lower portion of the respective front leg members, a sleeve fixedly connected to the upper end portion of the respective front leg members, a corresponding handle slideably disposed relative to said sleeve and having a lower end portion connected to a corresponding slider, the improvement comprising opposed frame members, said frame members being connected at one end to said sleeve and at its other end to a corresponding front leg member, a foldable seat back interconnected between said frame members, folding tong members formed by a pair of elongated arms interconnected intermediate their ends, each of said arms having their respective upper ends pivotally connected to a corresponding frame member and their respective lower ends pivotally connected to said slider slideably mounted on said front leg portion, actuating means interconnected between said frame members for effecting the collapsing and expansion of said tong members, a pair of rear leg members having wheels mounted on a lower end thereof, means for pivotally connecting an upper end of said rear leg members to a corresponding front leg member along an intermediate portion of said corresponding front leg member, a second set of folding tong members formed by elongated arms interconnected intermediate the ends thereof, said elongated arms of said second set having their respective upper ends hingedly connected to a corresponding rear leg member, a corresponding tie rod having one end thereof hingedly connected to the other end of said elongated arms of said second set, said tie rods having its respective other ends pivotally connected to said corresponding rear leg members whereby said rear leg members are collapsed and expanded in unison with said front leg members when said actuating means is operated and a pair of connecting rod means each having one end pivotally connected to an intermediate portion of one of said rear leg members and the other end pivotally connected to one of said corresponding sliders for collapsing and extending said rear legs.

2. The invention as defined in claim 1 wherein said slider defines a housing, a spring means disposed in said housing, said spring means biasing each of said connecting rod means for resiliently supporting each of said rear leg members.

3. The invention as defined in claim 1 wherein said means for connecting said rear leg members to said front leg members comprise a bracket fixed to each of said front leg members, and pivot means connecting said corresponding rear leg its corresponding bracket means.

4. The invention as defined in claim 1 and including means to variably adjust the inclination of said foldable seat back relative to said handle means.

5. The invention as defined in claim 4 wherein said adjusting means includes an adjusting strap connected to a corresponding frame member, said strap having its other end slideably adjustable relative to said sleeve, and means for securing said strap in an adjustable position.

6. The invention as defined in claim 5 wherein said securing means includes a lock pin, a knob connected to said lock pin, a spring means for biasing said lock pin toward the locked position, and said strap having a plurality of spaced openings for receiving said lock pin in an adjusted position.

7. The invention as defined in claim 6 wherein said sleeve includes a slot, said strap being slideably extended through said slot, said lock pin having a hook shaped end portion, the free end of said hook being adapted to be received in an opening of said strap to secure said strap in the adjusted position.

* * * * *